United States Patent
Chemisky et al.

(10) Patent No.: US 11,907,576 B2
(45) Date of Patent: Feb. 20, 2024

(54) METHOD FOR COMMUNICATING WITH ONE OR MORE FIELD DEVICES

(71) Applicant: Siemens Aktiengesellschaft, Munich (DE)

(72) Inventors: Eric Chemisky, Soultz sous forets (FR); Siva Prasad Katru, Karnataka (IN); Huai Shen Chen, Dalian (CN); Vishal S, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/527,535

(22) Filed: Nov. 16, 2021

(65) Prior Publication Data
US 2022/0156010 A1    May 19, 2022

(30) Foreign Application Priority Data
Nov. 19, 2020 (EP) .................................. 20208538

(51) Int. Cl.
| | | |
|---|---|---|
| G06F 3/06 | (2006.01) | |
| G05B 19/4155 | (2006.01) | |
| G06F 12/0802 | (2016.01) | |

(52) U.S. Cl.
CPC ....... *G06F 3/0659* (2013.01); *G05B 19/4155* (2013.01); *G06F 3/0604* (2013.01);
(Continued)

(58) Field of Classification Search
CPC .... G06F 3/0659; G06F 3/0604; G06F 3/0673; G06F 12/0802; G06F 2212/60;
(Continued)

(56) References Cited

U.S. PATENT DOCUMENTS

| | | | |
|---|---|---|---|
| 10,282,250 B1* | 5/2019 | Banerjee | ............... G06F 3/0659 |
| 10,621,096 B2* | 4/2020 | Traut | .................. G06F 12/0868 |

(Continued)

FOREIGN PATENT DOCUMENTS

| | | |
|---|---|---|
| CN | 1406037 | 3/2003 |
| CN | 1820468 | 8/2006 |

(Continued)

OTHER PUBLICATIONS

EP Search Report dated Aug. 12, 2021 based on EP20208538 filed Nov. 19, 2020.

*Primary Examiner* — Charles Rones
*Assistant Examiner* — Alexander Vinnitsky
(74) *Attorney, Agent, or Firm* — Cozen O'Connor

(57) ABSTRACT

A method for communicating with at least one field device via an interface device, wherein each field device is connected to a channel of the interface device, where the method includes receiving a first command associated with a first field device, from an industrial device, communicating with the first field device over a first communication channel for executing the received first command, receiving at least one command associated with the at least one field device, from the industrial device, the at least one commands including at least one command associated with a second field device from the at least one field device, and caching the at least one command in a memory module prior to the execution of the first command.

7 Claims, 4 Drawing Sheets

(52) U.S. Cl.
CPC ........ *G06F 3/0673* (2013.01); *G06F 12/0802* (2013.01); *G05B 2219/31368* (2013.01); *G06F 2212/60* (2013.01)

(58) Field of Classification Search
CPC ...... G05B 19/4155; G05B 2219/31368; G05B 2219/25228; G05B 2219/35375; G05B 19/4185; G05B 2219/32252
See application file for complete search history.

(56) References Cited

U.S. PATENT DOCUMENTS

| | | |
|---|---|---|
| 2003/0053481 A1 | 3/2003 | Abiru et al. |
| 2004/0148135 A1* | 7/2004 | Balakrishnan ..... G05B 19/4185 703/23 |
| 2008/0279204 A1 | 11/2008 | Pratt, Jr. et al. |
| 2009/0007156 A1 | 1/2009 | Baek et al. |
| 2010/0231432 A1 | 9/2010 | Shigei |
| 2012/0220218 A1* | 8/2012 | Laible ................ G05B 19/4185 455/39 |
| 2013/0016698 A1 | 1/2013 | Keller et al. |
| 2014/0095777 A1* | 4/2014 | Biswas ............... G06F 12/0802 711/104 |
| 2016/0099841 A1* | 4/2016 | Tiwari .................. H04W 76/11 370/255 |
| 2021/0405922 A1* | 12/2021 | Shin ...................... G06F 3/0653 |

FOREIGN PATENT DOCUMENTS

| | | |
|---|---|---|
| CN | 101682536 | 3/2010 |
| CN | 101835063 | 9/2010 |
| CN | 102754483 | 10/2012 |
| CN | 108494642 | 9/2018 |
| DE | 102017112817 | 12/2018 |
| WO | 2016054541 | 4/2016 |

* cited by examiner

FIG 3
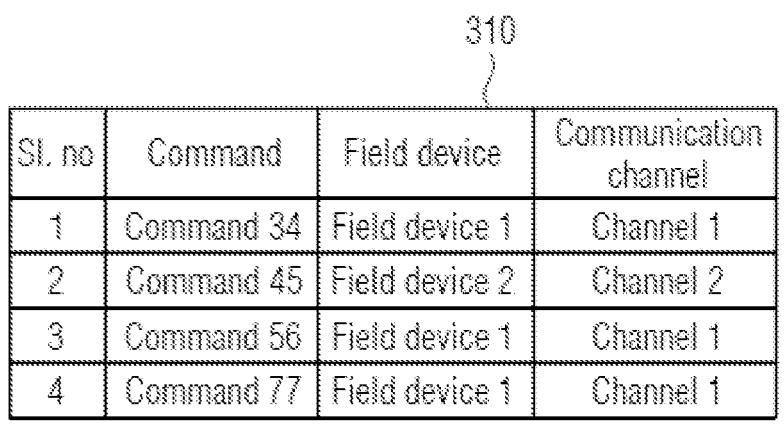
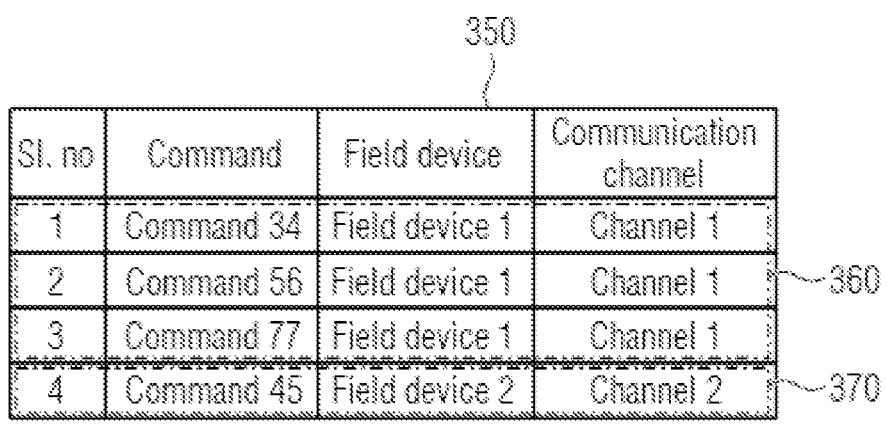

METHOD FOR COMMUNICATING WITH ONE OR MORE FIELD DEVICES

BACKGROUND OF THE INVENTION

1. Field of the Invention

The current invention relates to communication with field devices in industrial automation and, more particularly, relates to communication methodologies used by interface devices for communicating with field devices.

2. Description of the Related Art

Numerous field devices are used in industrial facilities and are used to monitor and operate physical processes in an industrial facility. The numerous field devices are connected to various control devices of a control system for transmitting measurements from the physical processes and for receiving commands. Connections between the field devices and the control devices may be established using interface and gateway devices. Often, in order to improve efficiency, one or more field devices may be connected to a single interface device using a multiplexing scheme. Accordingly, the interface device may then be connected to control or gateway devices for transmitting data between the field devices and the control or gateway devices.

The current invention relates to communication with field devices in industrial automation. As mentioned above, in order to improve efficiency and reducing infrastructure costs, often a plurality of field devices may be connected to an interface device using multiplexing schemes. The field devices may be connected to the interface device using a field level communication protocol, such as 4-20 mA protocol or Highway Addressable Remote Transducer (HART) protocol. The control or gateway devices may be connected to the interface device using a control level communication protocol such as ethernet based protocols such as Modbus or Profinet. Usually, the data rate of the field level communication protocol is considerably low in comparison to the control level communication protocol and, accordingly, this creates a bottleneck at the interface device. Consequently, the interface device may receive a plurality of commands relating to the field devices and may not be able to execute the commands on the field devices simultaneously due to the delay associated with the field level communication protocols. Accordingly, there is a need for a method and a device which addresses the above-mentioned issue.

SUMMARY OF THE INVENTION

In view of the foregoing, it is accordingly an object of the invention to provide an interface device and method for communicating with one or more field devices using an interface device.

This and other objects and advantages are achieved in accordance with the invention by a method in which each field device is connected to a channel of the interface device. The method comprises receiving a first command associated with a first field device, from an industrial device, communicating with the first field device over a first communication channel for executing the received first command, receiving one or more commands associated with the one or more field devices, from the industrial device, where the one or more commands includes at least one command associated with a second field device from the one or more field devices, and caching the one or more commands in a memory module prior to the execution of the first command.

Accordingly, the current disclosure addresses the issue of bottleneck at the interface device by enabling caching of commands at the interface device. Consequently, while the first command is being executed on the first field device, the interface device can continue to receive commands to be executed on other field devices from other industrial devices. As a result, the bottleneck at the interface device is mitigated.

In an exemplary embodiment, the method further comprises grouping the received one or more commands into one or more groups, where each group from the one or more groups comprises a set of commands associated with a corresponding field device connected on a corresponding channel to the gateway device. By grouping the commands based on the field device associated, the interface device can reduce the overall execution time of the commands since the time spent in switching channels is minimized.

In another exemplary embodiment, the method further comprises receiving an execution message from the first device subsequent to the execution of the first command on the first field device, where the execution message is indicative of a result based on the execution of the first command on the first field device. As a result, the interface device can detect the completion of the execution of the first command based on the received execution message. In another exemplary embodiment, the first command is associated with one of read and write operation in the first field device.

It is also an object of the invention to provide an interface device for communicating with a first field device and a second field device. The interface device comprises a network interface including a first communication channel associated with the first field device and a second communication channel associated with the second field device, and one or more processors connected to a memory module. The one or more processors are configured to receive a first command associated with a first field device, communicate with the first field device over the first communication channel for executing the received first command, receive a second command associated with the second field device during the execution of the received first command, and cache the second command in the memory module till execution of the first command is complete.

It is also an object of the invention to provide a gateway device for communicating with one or more field devices via an interface device, where the interface device is connected to the one or more field device over at least one corresponding communication channel. The gateway device comprises a network interface communicatively coupled to the interface device, and at least one processor connected to a memory module. The at least one processor of the gateway device is configured to group a plurality of commands associated with the one or more field devices, into one or more groups, where each group from the one or more groups comprising a set of commands associated with a corresponding field device is connected on a corresponding channel of the gateway device, and additionally configured to transmit a first group of commands to the gateway device for executing the first group of commands on a corresponding first field device and transmit a second group of commands to the gateway device for executing the second group of commands on a corresponding second field device, upon the completion of the execution of the first set of commands.

It is also an object of the invention to provide a non-transitory storage medium for communicating with a first field device and a second field device. The non-transitory storage medium comprises a plurality of instructions which, when executed on at least one processor, causes the at least one processor to receive a first command associated with a first field device, communicate with the first field device over a first communication channel for executing the received first command, receive a second commands associated with the second field device during the execution of the received first command and cache the second command in the memory module till execution of the first command is complete. The advantages of the method apply to the devices and the non-transitory storage medium described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which:

FIG. 3 is an illustration of a plurality of commands in a first table and two groups of commands in a second table in accordance with the invention;

DETAILED DESCRIPTION OF THE EXEMPLARY EMBODIMENTS

Figure 1:
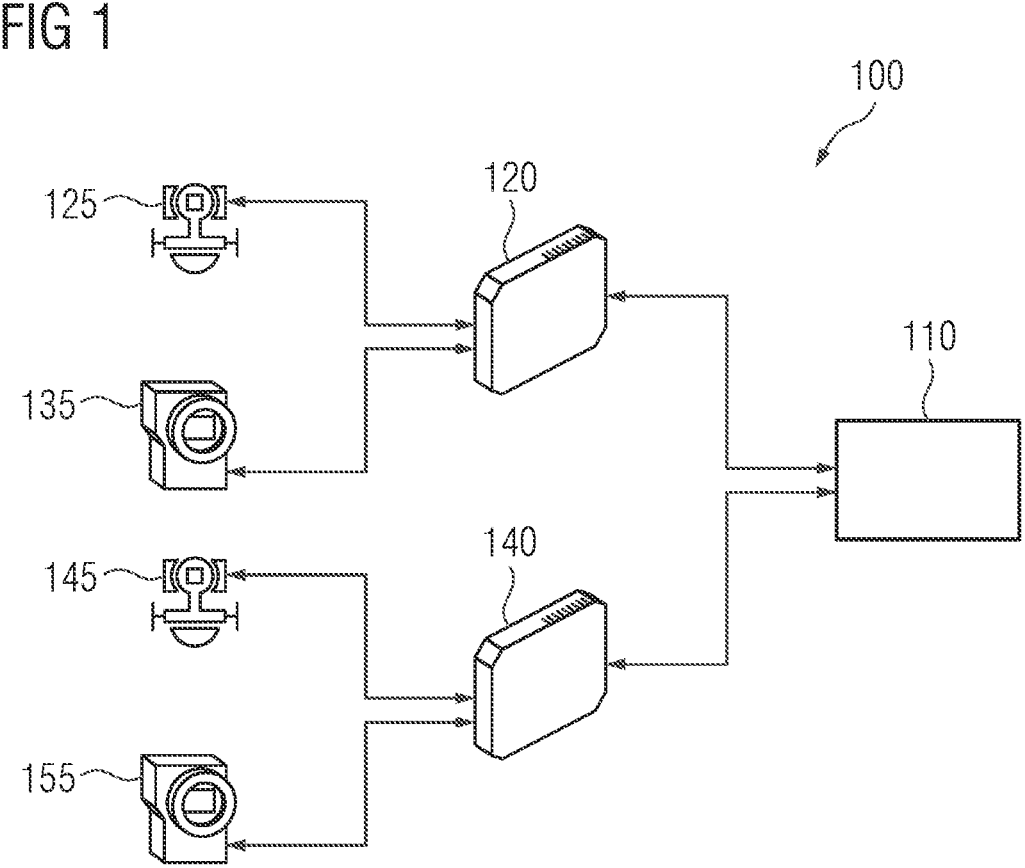
FIG. 1 is an illustration of an exemplary industrial facility with a plurality of field devices in accordance with the invention.

FIG. 1 illustrates a plurality of field devices (125, 135, 145 and 155) in industrial facility 100. Industrial facility herein refers to any environment where one or more industrial processes, such as manufacturing, refining, smelting, assembly of equipment, may occur and includes process plants, oil refineries, automobile factories, and the like. In addition to the field devices shown in the FIG. 1, the industrial facility 100 includes a plurality of industrial devices including control devices, mobile devices, and/or operator stations. The control devices include process controllers, programmable logic controllers, supervisory controllers, automated guided vehicles, robots, and/or operator devices. One or more control devices are connected to a plurality of field devices (shown in FIG. 1 as field devices 125, 135, 145 and 155). The plurality of the field devices includes actuators and sensor devices for monitoring and controlling industrial processes in the industrial facility 100. These field devices can include flowmeters, value actuators, temperature sensors, and/or pressure sensors. Additionally, the industrial facility 100 may include an operator station for displaying the status of the industrial facility 100 to an operator and for allowing the operator to define KPIs for the control of the industrial processes in the facility. All the industrial devices may be connected to each other via a one or more network (realized via wired and wireless technologies).

Communication in the above-mentioned one or more network via wired and wireless methodologies or technologies. Accordingly, the industrial facility includes a plurality of network devices, such as interface and gateway devices. The interface devices are used for connecting the field devices to other industrial devices in the industrial facility. Similarly, the gateway devices are used for connecting the industrial devices to other automation systems that may be inside or outside the industrial facility. For example, as shown in FIG. 1, the field devices 125 and 135 are connected to the interface device 120 for communicating with the gateway device 110. The interface device 120 is configured to communicate with the field devices 125 and 135 over a field level communication protocol, such as HART, and communicate with the gateway device 110 over a control level communication protocol, such as Modbus. Additionally, the field devices 125 and 135 may be directly connected to a corresponding controller over the field level communication protocol. In addition to the interface device 120, the field devices 125 and 135 may also be connected to a controller (not shown ion FIG. 1) in a master slave configuration, with the controller in the master configuration and the field devices in the slave configuration. In such a configuration, the interface device 120 is connected to the field devices 125 and 135 in a secondary master configuration. The interface device 120 is configured to receive read and write commands for the field devices from the gateway device 110 and coordinate execution of these commands with the field device 125 and 135. The gateway device may be connected to a cloud system and transmits measurements from the field device 125 and 135 via the interface device 120. Similarly, the field devices 145 and 155 are connected to the interface device 150 for communicating with the gateway device 110. The interface device 120 and 140 may receive a plurality of commands for the associated field devices from the gateway device 110 and perform a cached execution of the commands, to reduce bottleneck due to the low speed associated with the field level communication protocol, as explained further with respect FIG. 2.

It should be noted by a person skilled in the art that, while the above-mentioned industrial facility is described with two field device connected to a single interface devices, a plurality of field devices may be connected to a single interface device.

Figure 2:
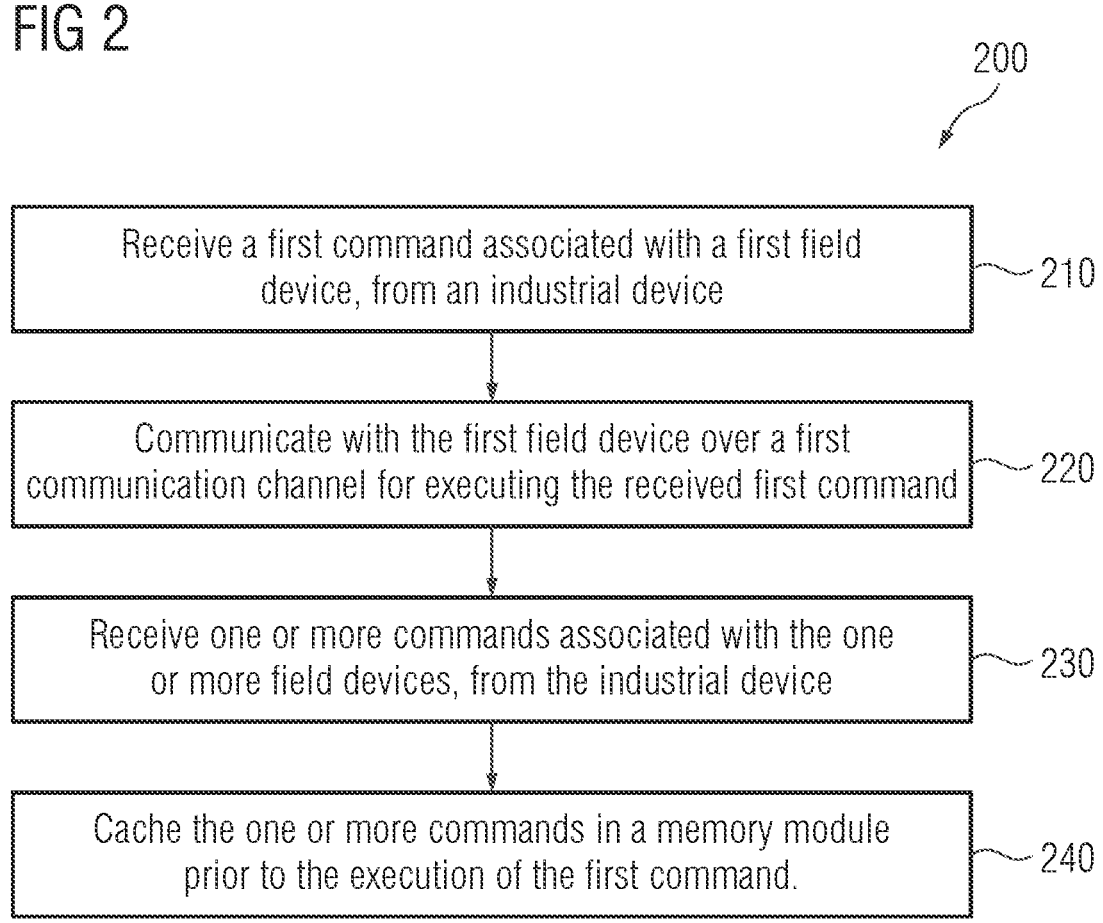
FIG. 2 is an exemplary flowchart of the method for communicating with one or more field devices in accordance with the invention.

FIG. 2 illustrates a method 200 of communicating with one or more field devices (125, 135), using an interface device 120. Each field device (125, 135) is connected to a corresponding channel of the interface device 120. The method 200 is performed by the interface device 120. At step 210, the interface device 120 receives a first command associated with a first field device 125, from an industrial device. In an exemplary embodiment, the industrial device is the gateway device 110. In another exemplary embodiment, the first command is a read command from the gateway device to read one or more measurements made by the first field device 125.

Based on the received first command, at step 220, the interface device 120 then communicates with the first field device 125 over a first communication channel for executing the received first command. In an exemplary embodiment, the first communication channel is a HART channel. Accordingly, because the first field device 125 may be connected to a controller in master-slave configuration, the interface device 120 checks whether the first communication channel is free, and synchronizes to the first communication channel prior to communicating the first command to the first field device 125. The interface device 120 then awaits a response from the first field device 125 on the first communication channel.

In the meantime, at step 230, the interface device 120 receives one or more commands associated with the one or more field devices from the industrial device, i.e., the gateway device 110. The one or more commands includes at least one command associated with the second field device 135. While the interface device receives the one or more commands, the execution on the first command on the first field device 124 is ongoing and the interface device 120 is synchronized on the first communication channel to receive a response from the first field device 125.

Accordingly, at step 240, the interface device 120 caches the received one or more commands in a memory module prior to the execution of the first command. The execution of the first command is ongoing. Accordingly, the interface device 120 is unable to change channels for the execution of the received one or more commands and accordingly, the one or more commands are cached until the interface device 120 receives a response from the first field device 125 indicative of the completion of the execution of the first field device 125. Consequently, the interface device 120 is capable of receiving additional commands while the interface device 120 is executing the first command. This reduces the bottleneck at the interface device 120.

In accordance with an exemplary embodiment, the method 200 further comprises grouping the received one or more commands into one or more groups, where each group from the one or more groups comprises a set of commands associated with a corresponding field device connected on a corresponding channel to the gateway device. By grouping the received one or more commands into groups and then executing the groups allows for reduction in the overall execution time, as further explained with respect to FIG. 3.

FIG. 3 illustrates exemplary commands in a first table 310 and the one or more groups of one or more commands in a second table 350. The first table 310 includes the one or more commands received by the interface device 120. In the current example, the first table 310 includes four commands: commands 34, 56, 77 related to the first field device 125 connected to the interface device 120 on the first communication channel and command 45 related to the second field device 135 connected to the interface device 120 on the second communication channel. As mentioned previously, the interface device 120 receives the commands 34, 56, 77 and 45 while the first command is being executed and the interface device 120 awaits a response from the first field device 125 in relation to the execution of the first command on the first communication channel. In an embodiment, the four commands are received sequentially in accordance with the sequence shown in the first table 310 (i.e., command 34, command 45, command 56 and command 77). In another exemplary embodiment, the interface device 120 receives all four commands together from the gateway device 110.

As mentioned above, subsequent to the receipt of the commands, the interface device 120 groups the commands into one or more groups based on the field devices associated with the commands. The commands 34, 56 and 77 are related to the first field device 125. As a result, the commands 34, 56 and 77 are grouped together in a first group 360. Similarly, the command 45, which is related to the second field device, is grouped into a second group 370.

Subsequent to grouping, when the execution of the first command is complete, the interface device 120 executes the groups of commands. In the example, since the first command which was previously executed, the interface device 120 selects the first group of commands for execution, as this does not require a change in communication channel. This accordingly reduces the overall execution time. Upon completion of the commands in the first group, the interface device 120 then executes the commands in the second group. By ensuring group-based execution, the number of communication channel change and synchronization is reduced and, accordingly, the overall execution time of the four commands is reduced.

In an exemplary embodiment, the method 200 further comprises receiving an execution message from the first field device 125 subsequent to the execution of the first command on the first field device 125, where the execution message is indicative of a result based on the execution of the first command on the first field device 125.

The present disclosure can take a form of a computer program product comprising computer-usable or computer-readable medium storing program code for use by or in connection with one or more computers, processing units, or instruction execution system. For example, the method 200 may be realized in a single device or across one or more devices.

Figure 4:
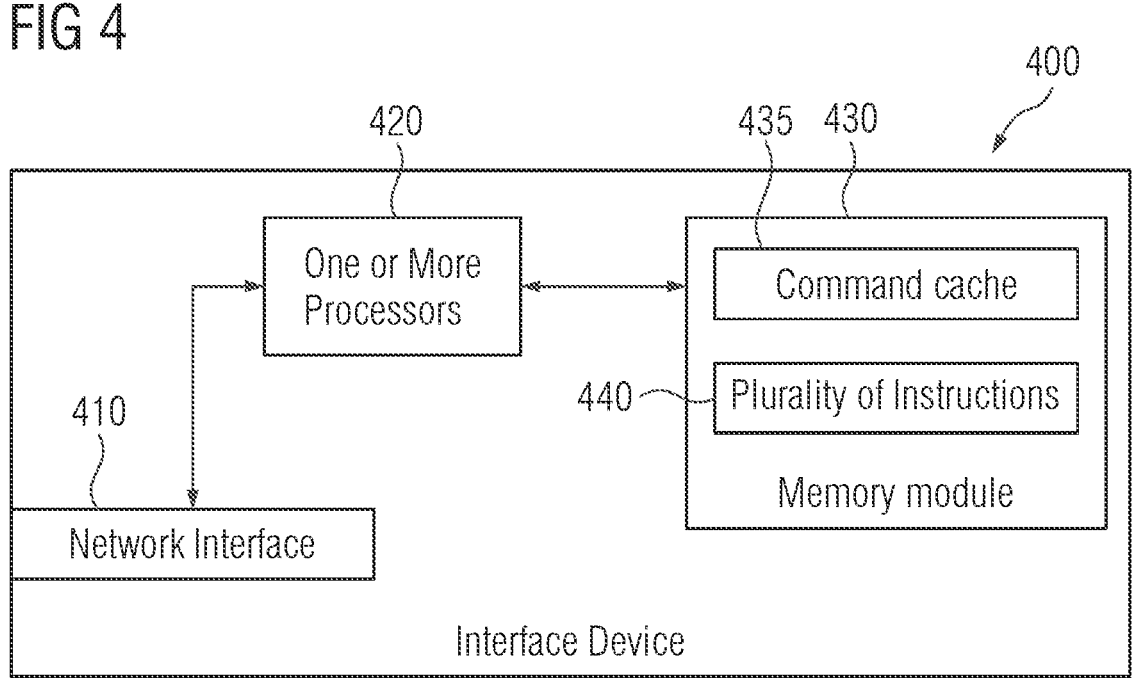
FIG. 4 is an illustration of an exemplary interface device for communicating one or more field devices in accordance with the invention.

Accordingly, the current disclosure describes an interface device 400 for communicating with the first field device 125 and the second field device 135 (FIG. 4). The interface device 400 comprises a network interface 410 including a first communication channel associated with the first field device 125 and a second communication channel associated with the second field device 135. The interface device 400 further comprises one or more processors 420 connected to a memory module 430. The memory module 430 includes a command cache module 435 and a plurality of instructions 440. The plurality of instructions, when executed on the one or more processors cause 420, cause the one or more processors 420 to receive a first command associated with the first field device 125, communicate with the first field device 125 over the first communication channel for executing the received first command, receive a second command associated with the second field device 135 during the execution of the received first command, and cache the second command in the memory module 430 specifically in the command cache module 435, till execution of the first command is complete. The first command is associated with one of read and write operation in the first field device.

In an exemplary embodiment, the one or more processors 420 are further configured to receive one or more commands associated with the one or more field devices; and group the received one or more commands into one or more groups, as mentioned above. In an example, the one or more processors 420 are further configured to receive an execution message from the first device subsequent to the execution of the first command on the first field device 125, where the execution message is indicative of a result based on the execution of the first command on the first field device 125.

Figure 5:
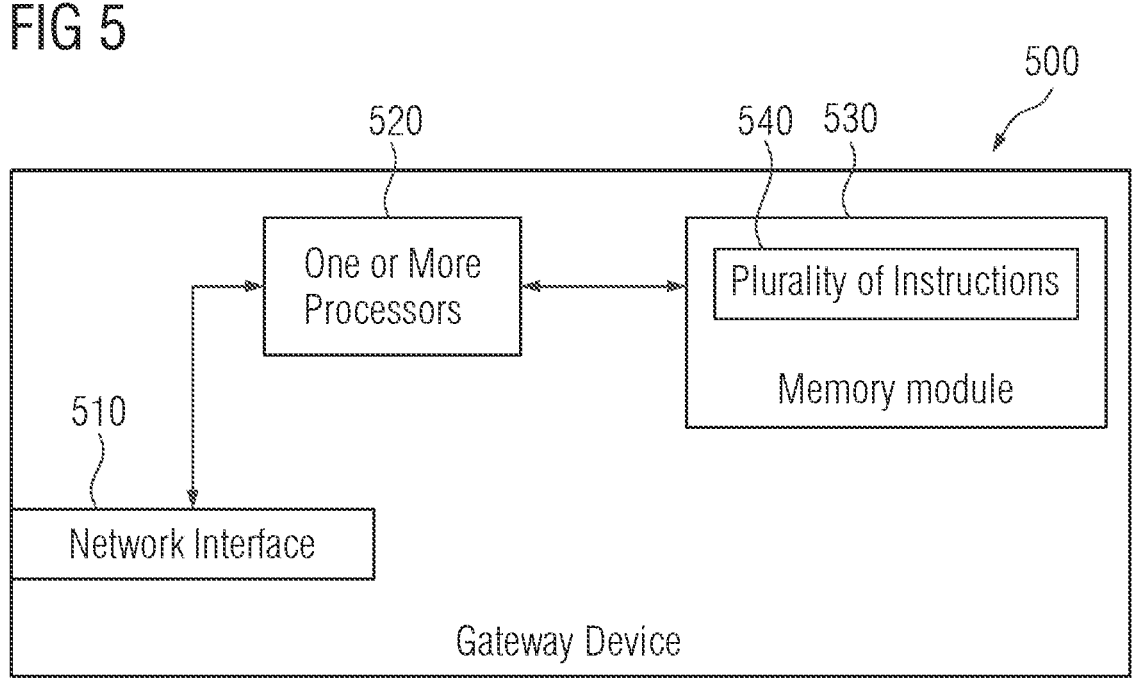
FIG. 5 is an illustration of an exemplary gateway device for communicating one or more field devices in accordance with the invention.

In another aspect, the current disclosure describes a gateway device 500 for communicating with one or more field devices (125, 135) via an interface device 120 (FIG. 5). The interface device 400 is connected to the one or more field device 125 and 135 over corresponding one or more communication channels. The gateway device 500 comprises a network interface 510 communicatively coupled to the interface device 120 and one or more processors 520 connected to a memory module 530. The memory module 530 includes a plurality of instructions 540 which, when executed on the one or more processors 520, cause the one or more processors 520 to group a plurality of commands associated with the one or more field devices, into one or more groups, where each group from the one or more groups comprises a set of commands associated with a corresponding field device connected on a corresponding channel of the interface device 120, transmit a first group of commands to the interface device 120 for executing the first group of commands on a corresponding first field device, and transmit a second group of commands to the interface device 120 for executing the second group of commands on a corresponding second field device, upon the completion of the execution of the first set of commands.

Additionally, the current disclosure describes a non-transitory storage medium 430 (also referred to as memory module 430) for communicating with the first field device 125 and the second field device 135 (see FIG. 4). The non-transitory storage medium 430 comprises a plurality of instructions 440 which, when executed on one or more processors 420, cause the one or more processors 420 to receive a first command associated with a first field device 125, communicate with the first field device 125 over a first communication channel for executing the received first command, receive a second command associated with the second field device 135 during the execution of the received first command, and cache the second command in a cache memory module 435 till execution of the first command is complete.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for communicating with at least one field device utilizing an interface device, each field device being connected to a communication channel of the interface device, the method comprising:
   a) receiving a first command associated with a first field device from an industrial device;
   b) communicating with the first field device over a first communication channel to execute the received first command, said communicating comprising performing a check, by the interface device, to determine whether the first communication channel is free and synchronizing the interface device to the first communication channel prior to communicating the first command to the first field device;
   c) receiving at least one command associated with the at least one field device, at least one command including at least one command associated with a second field device from the at least one field device;
   d) caching the at least one command in a memory module prior to execution of the first command; and
   e) grouping the received at least one command into at least one group, each group of a plurality of groups of the at least one group comprising a set of commands associated with a corresponding field device connected on a corresponding communication channel to the interface device.

2. The method as claimed in claim 1, further comprising: receiving an execution message from the first field device subsequent to execution of the first command on the first field device, the execution message being indicative of a result based on the execution of the first command on the first field device.

3. The method as claimed in claim 1, wherein the first command is associated with one of a read and a write operation in the first field device.

4. An interface device for communicating with a first field device and a second field device, the interface device comprising:
   a) a network interface connectable to a first communication channel associated with the first field device and a second communication channel associated with the second field device; and
   b) at least one processor connected to a memory module, the at least one processor being configured to:
      i) receive a first command associated with a first field device,
      ii) communicate with the first field device over the first communication channel to execute the received first command, said communication comprising performing a check to determine whether the first communication channel is free and synchronizing with the first communication channel prior to communicating the first command to the first field device, iii) receive a second command associated with the second field device during the execution of the received first command, iv) cache the second command in the memory module till execution of the first command is complete, v) receive at least one command associated with one of the first field device or the second field device, and vi) group the received at least one command into at least one group, each group of a plurality of groups of the at least one group comprising a set of commands associated with one of the first and second field devices.

5. The interface device as claimed in claim 4, wherein the at least one processor is further configured to receive an execution message from the first field device subsequent to execution of the first command on the first field device, the execution message being indicative of a result based on the execution of the first command on the first field device.

6. The interface device as claimed in claim 5, wherein the first command is associated with one of a read and a write operation in the first field device.

7. A gateway device for communicating with at least one field device via an interface device, the interface device being connected to the at least one field device over at least one corresponding communication channel, the gateway device comprising:

a) a network interface communicatively coupled to the interface device; and b) at least one processor connected to a memory module, the at least one processor being configured to:

i) group a plurality of commands associated with the one or more field devices, into at least one group of the plurality of groups, each group of a plurality of the at least one group comprising a set of commands associated with a corresponding field device connected on a corresponding channel of the interface device, ii) transmit a first group of commands to the interface device to execute the first group of commands on a corresponding first field device, a check being performed by the interface device to determine whether the first communicating channel is free and the interface device synchronizing to the first communication channel prior to communicating the first command to the first field device, and iii) transmit a second group of commands to the interface device for executing the second group of commands on a corresponding second field device, upon the completion of execution of the first group of commands.

* * * * *